United States Patent Office
2,892,850
Patented June 30, 1959

2,892,850
21-CHLORO STEROIDS

Josef Fried and Josef E. Herz, New Brunswick, N.J., assignors to Olin Mathieson Chemical Corporation, New York, N.Y., a corporation of Virginia No Drawing. Original application June 4, 1954, Serial No. 434,672, now Patent No. 2,763,671, dated September 18, 1956. Divided and this application April 16, 1956, Serial No. 582,314

3 Claims. (Cl. 260—397.3)

This application is a division of our parent application, Serial No. 434,672, filed June 4, 1954, and now Patent No. 2,763,671, granted September 18, 1956.

This invention relates to the synthesis of valuable steroids; and has for its objects the provision of (I) an advantageous process of preparing steroids of the pregnane (including the pregnene and allopregnane) series having a 9α-halogen substituent and an 11-keto or 11β-hydroxy substituent, and of (II) certain compounds useful themselves as physiologically-active steroids and in the preparation of other physiologically-active steroid derivatives.

(The process of this invention essentially comprises (a) converting an 11α,21-dihydroxy steroid of the pregnane series into the corresponding 11α,21-di(alkanesulfonyloxy) or 11α-alkane-sulfonyloxy-21-chloro derivatives thereof, (b) converting the latter into the corresponding $\Delta^{9(11)}$-21-chloro derivative, (c) converting said $\Delta^{9(11)}$ compound into the corresponding 9α-bromo or chloro, 11β-hydroxy derivative, (d) converting said 9α-bromo or chloro compound to the corresponding 9β,11β-oxido,21-chloro derivative, and (e) converting said 9β,-11β-oxido derivative to the corresponding 9α-halo,11β-hydroxy compound.

The compounds of this invention comprises: $\Delta^{9(11)}$,21-chloro steroids of the pregnane series.

For a clearer understanding of the foregoing general and following detailed description of one of the related processes of this invention, reference is made to the following schematic analysis:

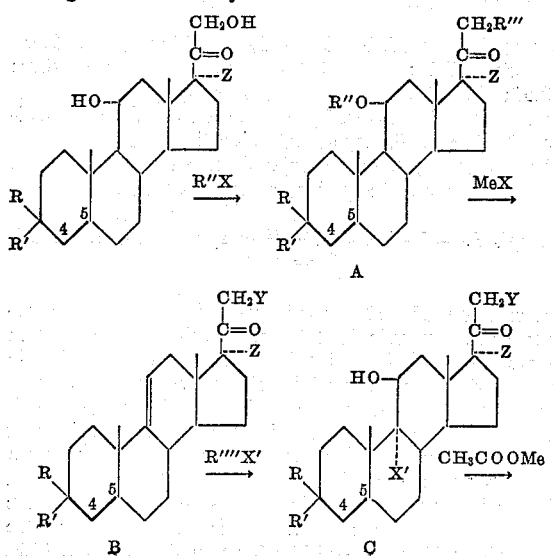

wherein the 4,5 position is double-bonded or saturated (the 4,5-double-bonded steroids are preferred), and wherein R is hydrogen, R' is hydroxy, or together R and R' is oxo (keto) or a group convertible thereto by hydrolysis (e.g. ketal), R and R' as oxo being preferred; Z is hydrogen or α-hydroxy; R" is an alkanesulfonyl radical, particularly a lower alkane sulfonyl such as methane-sulfonyl, ethanesulfonyl, hexanesulfonyl, etc., and is preferably methanesulfonyl; X is chloro, bromo, or iodo; R'" is R"O or chloro; Me is a metal, such as an alkali metal or an alkaline earth metal, the halogen salt of which is soluble in the solvent employed in the indicated reaction, preferably an alkali metal, such as sodium or lithium; Y is hydrogen, bromo, or chloro; R''''X' is an N-bromamide (including imide) of a carboxylic acid (including derivatives), an N-chloramide (including imide) of a carboxylic acid (including derivatives), dibromodimethylhydantoin, or dichlorodimethylhydantoin; X' is bromo or chloro; Y' is acetoxy or chloro; and X" is a halo (fluoro, chloro, bromo, or iodo).

Compounds suitable as initial reactants in the process of this invention set out in the foregoing schematic analysis include compound epi-F ($\Delta^4$-pregnene-11α,17α,21-triol-3,20-dione), epi-corticosterone ($\Delta^4$-pregnene-11α,21-diol-3,20-dione), 11α,17α,21-trihydroxy-pregnane-3,20-dione, 11α,21-dihydroxypregnane-3,20-dione, etc. These compounds are reacted with alkanesulfonyl halides (sulfonyl chlorides are preferred but other halides such as bromides and iodides may be used). Although any alkanesulfonyl chloride may be used, the alkane group is preferably a lower alkane, methanesulfonyl chloride (mesyl chloride) being particularly preferred. The reaction is carried out in accordance with the general method disclosed in the U.S. application of Josef Fried, Serial No. 417,489, filed March 10, 1954, now Patent No. 2,852,511 granted September 16, 1958, and in the following examples, by reacting the steroid and sulfonyl halide in the presence of dry pyridine or other tertiary organic base.

This reaction results in the production of compounds A wherein the alkanesulfonyloxy radical in the 11α-position corresponds to the alkanesulfonyl halide used in the reaction and the radical in the 21-position also corresponds to the alkanesulfonyloxy radical if Z is α-hydroxy, and is a mixture of steroids having the corresponding 21-alkanesulfonyloxy radical and steroids having a 21-chloro radical if Z is hydrogen.

Compounds A are then reacted with a metal halide (MeX) wherein MeX is as above-defined. Particularly preferred metal halides are lithium chloride, lithium bromide and sodium iodide.

Other utilizable salts include beryllium chloride, calcium chloride, potassium bromide, calcium bromide, and barium bromide. The reaction is carried out in the presence of at least one mole/mole of steroid of an alkali metal salt of a weak acid, such as an alkali metal lower alkanoate (preferably sodium acetate), an alkali metal carbonate, an alkali metal bicarbonate, etc. The reaction is conducted in a suitable solvent wherein both the metal halide and alkali metal salt of the weak acid are soluble.

Such solvents include the lower alkanoic acids (particularly glacial acetic acid), certain alcohols, and ketones.

This reaction results in the production of compounds B wherein the 21-substituent is: bromine when a metal bromide is used; chlorine when a metal chloride is used; and hydrogen when a metal iodide is used (the intermediately formed 21-iodo derivative having been reduced).

Compounds B are then reacted with R''''X', wherein R''''X' is as above-defined, and is preferably N-bromoacetamide, N-bromosuccinimide, N-chloroacetamide, N-chlorosuccinimide, dibromodimethyl hydantoin, or dichlorodimethyl hydantoin, in accordance with the method disclosed in the copending applications of Fried, Serial No. 417,489, filed March 10, 1954, and Fried et al., Serial No. 429,108, filed May 11, 1954. As disclosed in those applications, the conversion is preferably effected in the presence of perchloric acid or other relatively strong acids. This reaction produces compounds C having a 9α-chloro or bromo substituent and an 11β-hydroxy radical.

Compounds C are then reacted with alkali metal acetates such as potassium acetate, in a suitable solvent such as alcohols, lower alkanoic acids, or ketones (preferably in an alkanol such as ethanol) as described in the aforementioned application Serial No. 417,489.

By this reaction, compounds D are formed having a 9β,11β-oxido radical, and a 21-substituent which is: hydrogen when the 21-substituent of compounds C is hydrogen; acetoxy, when the 21-substituent of compounds C is bromo; and chloro, when the 21-substituent of compounds C is chloro. In the case where the 21-substituent of compounds C is chloro, by reacting compounds C in the presence of an alkali metal iodide (e.g. potassium iodide) as well as the alkali metal acetate (e.g. potassium acetate), the 21-substituent in compounds D obtained is an acetoxy rather than a chloro radical.

Compounds D are then reacted with hydrogen halide (i.e. hydrofluoric, hydrochloric, hydrobromic, or hydroiodic acid) in a suitable solvent (e.g. chloroform) as disclosed in the aforementioned application Serial No. 417,489. By this reaction, compounds E are formed having a 9α-halo and 11β-hydroxy radical and a 21-substituent corresponding to the substituent in compounds D. The process of this invention is described in detail in the following schematic analysis and examples employing compound epi-F as a starting material, but is of course not limited thereto:

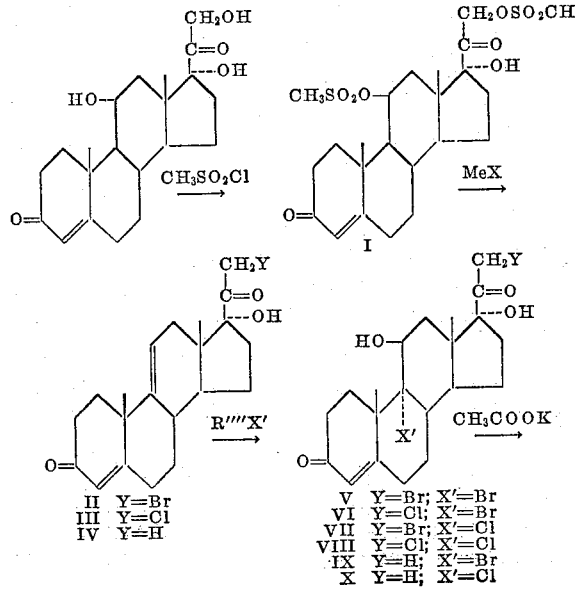

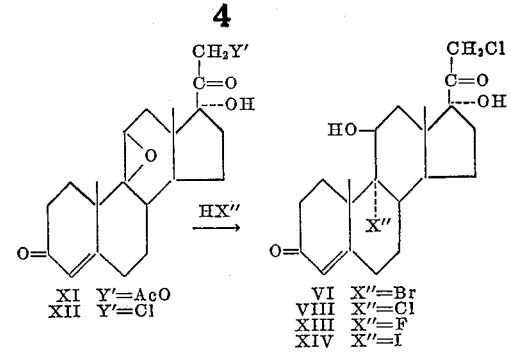

*Example 1.—Δ⁴-pregnene-11α,17α,21 - triol - 3,20 - dione 11α,21-dimesylate (I) (epi-F 11α,21-dimesylate)*

To a solution of 10 g. epi-F in 110 ml. anhydrous pyridine is added at 0° C. (all temperatures given hereinafter being in centigrade) a solution of 6.6 ml. methanesulfonyl chloride in 10 ml. chloroform. The reaction mixture is allowed to remain at 0° for fifteen hours, after which 1 g. of ice is added. After an additional one-half hour at 0°, the mixture is concentrated in vacuo to a small volume. The resulting residue is taken up in chloroform and water, and the chloroform solution is washed with cold dilute hydrochloric acid, dilute sodium bicarbonate solution, and finally with water. The chloroform solution is then dried over sodium sulfate and evaporated to dryness in vacuo. The crystalline residue (about 12.4 g.) is recrystallized from 95% ethanol, yielding the analytically pure dimesylate, having the following properties: M.P. about 162° (dec.); $[\alpha]_D^{23}+97°$ (c., 0.98 in dioxane); analysis [calculated for $C_{23}H_{34}O_9S_2$ (502.62): C, 53.26; H, 6.60; S, 12.36; found (approximately): C, 53.42; H, 6.29; S, 11.00].

*Example 2.—21-chloro-Δ⁴-pregnene-11α - ol - 3,20-dione 11α-mesylate and epicorticosterone dimesylate*

To a solution of 164 mg. of epicorticosterone in 2 ml. of dry pyridine is added at 0° C. a solution of 11 ml. of methanesulfonyl chloride in 1 ml. of chloroform and the mixture is allowed to stand in the refrigerator overnight. The excess mesyl chloride is destroyed with ice and the mixture worked up as described in Example 1. About 176 mg. of crystalline material is obtained, which after two recrystallizations from acetone-ether gives about 63 mg. of 21-chloro-Δ⁴-pregnane-11α-ol-3,20-dione 11α-mesylate, M.P. 156–157° C. (dec.), $[\alpha]_D+137°$ (c., 0.34 in chloroform);

$\lambda_{max.}^{EtOH}$ 238 mμ (ε=16,650), $\lambda_{max.}^{Nujol}$ 5.81 μ, 6.04 μ, 6.23 μ.

*Analysis.*—Calcd. for $C_{22}H_{31}O_5SCl$ (442.99): C, 59.65; H, 7.05; S, 7.24; Cl, 8.00. Found: C, 59.19; H, 6.91; S, 8.52; Cl, 7.78.

The material recovered from the mother liquor constitutes the 11α,21-dimesylate of epicorticosterone.

The following three examples illustrate the preparation of Δ⁹⁽¹¹⁾-pregnene derivatives of this invention.

*Example 3.—21 - bromo-Δ⁴,⁹⁽¹¹⁾-pregnadiene-17α-ol-3,20-dione (II)*

A solution of 100 mg. of epi-F dimesylate (I) (prepared as in Example 1), 25 mg. of anhydrous potassium acetate and 200 mg. of anhydrous lithium bromide in 6 ml. of glacial acetic acid is refluxed with the exclusion of moisture for 1 hour. The slightly colored solution is then evaporated to dryness in vacuo. The residue is taken up in chloroform and water and washed with NaHCO₃ and again with water. The dried chloroform solution is evaporated leaving a crystalline residue which weighs about 76 mg. Recrystallization from acetone gives prisms M.P. 198–199° (dec.), about 48 mg.; M.P.

191–192° (dec.). about 13 mg., $[\alpha]_D + 106°$ (c., 0.56 in chloroform) yield: about 75%.

$\lambda_{max.}^{EtOH}$ 239 m$\mu$ ($\epsilon = 16,400$), 280 m$\mu$ ($\epsilon = 995$), $\lambda_{max.}^{Nujol}$ 2.97 $\mu$, 5.8 $\mu$, 6.12 $\mu$.

*Analysis.*—Calcd. for $C_{21}H_{27}O_3Br$ (407.35): C, 61.91; H, 6.68; Br, 19.62. Found: C, 61.79; H, 6.73; Br, 19.59.

Example 4.—$\Delta^{4,9(11)}$-pregnadiene-17$\alpha$-21-diol-3,20-dione 21-acetate A solution of 21 mg. of 21-bromo-$\Delta^{4,9(11)}$-pregnadiene-17$\alpha$-ol-3,20-dione (II) and 125 mg. of anhydrous potassium acetate in 5 ml. of absolute ethanol is refluxed for one hour. The solvent is removed in vacuo, the residue taken up in water and chloroform and the chloroform solution washed several times with water. Evaporation of the solvent yields about 35 mg. of a crystalline solid, which after recrystallization from acetone affords about 14 mg. of $\Delta^{4,9(11)}$-pregnadiene-17$\alpha$,21-diol-3,20-dione 21-acetate, disclosed in the aforementioned application Serial No. 417,489.

Example 5.—21-chloro-$\Delta^{4,9(11)}$-pregnadiene-17$\alpha$-ol-3,20-dione (III)

A solution of 100 mg. of epi-F dimesylate (I), 25 mg. of anhydrous potassium acetate and 200 mg. of lithium chloride in 6 ml. of glacial acetic acid is refluxed for 1 hour with the exclusion of moisture. The acetic acid is removed in vacuo, the residue taken up in chloroform and water and the chloroform solution washed with bicarbonate solution and again with water. The chloroform solution is dried over sodium sulfate and on evaporation leaves about 68 mg. of a crystalline residue. Recrystallization from acetone yields about 49 mg. (68%) M.P. 242–243° (dec.), $[\alpha]_D + 120°$ (c., 0.36 in chloroform), $\lambda_{max.}^{EtOH}$ 238 m$\mu$ ($\epsilon = 18,500$), $\lambda_{max.}^{Nujol}$ 2.91 $\mu$, 5.81 $\mu$, 6.10 $\mu$.

*Analysis.*—Calcd. for $C_{21}H_{27}O_3Cl$ (362.89): C, 69.50; H, 7.50; Cl, 9.77. Found: C, 69.94; H, 7.72; Cl, 9.75.

Example 6.—$\Delta^{4,9(11)}$-pregnadiene-17$\alpha$-ol-3,20-dione (IV)

A solution of 100 mg of epi-F dimesylate (I), 25 mg. of anhydrous potassium acetate and 400 mg. of sodium iodide in 6 ml. of glacial acetic acid is refluxed for 30 minutes. The solution soon assumes the brown iodine color. At the end of the reaction time the acetic acid is removed in vacuo, the residue taken up in water and chloroform and the chloroform solution washed with sodium sulfite solution and water. After drying over sodium sulfate and evaporation of the solvent in vacuo, about 63 mg. of crystals (93%) are obtained. Recrystallization from acetone yields about 43 mg. of pure $\Delta^{4,9(11)}$-pregnadiene-17$\alpha$-ol-3,20-dione, M.P. 216–217°, $[\alpha]_D + 63°$ (c., 0.39 in chloroform). Infrared comparison shows identity with an authentic sample.

Following the procedure of Example 6 with the 21-chloro-11$\alpha$-hydroxyprogesterone 11$\alpha$-mesylate of Example 2 substituted for epi-F dimesylate, 21-chloro-$\Delta^{4,9(11)}$-pregnadiene-3,20-dione is produced.

The following examples illustrate the preparation of the 9$\alpha$-halo,11$\beta$-hydroxy pregnane derivatives in accordance with this invention:

Example 7.—9$\alpha$,21-dibromo-$\Delta^4$-pregnene-17$\alpha$,11$\beta$-diol-3,20-dione (V) [9$\alpha$,21-dibromo-11$\beta$,17$\alpha$-dihydroxyprogesterone]

To a solution of 250 mg. of 21-bromo-$\Delta^{4,9(11)}$-pregnadiene-17$\alpha$-ol-3,20-dione (II) (M.P. 192–193°) in 25 ml. of pure dioxane and 2.5 ml. water is added 125 mg. of N-bromoacetamide and 1.5 ml. of 1 N HClO$_4$. The mixture is stirred at room temperature and after 1 hour and 30 minutes the excess N-bromoacetamide is destroyed with Na$_2$SO$_3$ solution. The reaction mixture is diluted with an equal volume of chloroform, the resulting aqueous layer separated off and the chloroform-dioxane layer washed with bicarbonate and water. After drying and evaporation of the solvents in vacuo an oil is obtained which crystallized on addition of ether. The crystals are leached with more ether, and dried, M.P. 148–150° (dec.), about 237 mg. (77%). A sample is recrystallized twice from acetone-ether, M.P. 169–170° (dec.), $[\alpha]_D + 161°$ (c., 0.39 in EtOH), $\lambda_{max.}^{EtOH}$ 242 m$\mu$ ($\epsilon = 17,400$), $\lambda_{max.}^{Nujol}$ 3.01 $\mu$, 5.79 $\mu$, 6.10 $\mu$.

*Analysis.*—Calcd. for $C_{21}H_{28}O_4Br_2$ (504.27): C, 50.02; H, 5.60; Br, 31.70. Found: C, 50.68; H, 5.88; Br, 30.09.

Example 8.—9$\alpha$-bromo-21-chloro-$\Delta^4$-pregnene-11$\beta$,17$\alpha$-diol-3,20-dione (VI) [9$\alpha$-bromo-21-chloro-11$\beta$,17$\alpha$-dihydroxy-progesterone]

To a solution of 100 mg. of 21-chloro-$\Delta^{4,9(11)}$-pregnadiene-17$\alpha$-ol-3,20-dione (III) in 10 ml. of dioxane and 1 ml. of water is added 56 mg. of N-bromoacetamide and 0.65 ml. of 1 N HClO$_4$. The solution was stirred for 1½ hours and the excess N-bromoacetamide is destroyed by the addition of a dilute sodium sulfite solution. After the addition of 30 ml. of chloroform the resulting layers are separated and the chloroformdioxane phase washed with water, NaHCO$_3$ and again with water, dried over sodium sulfate and evaporated in vacuo. An oil is obtained which crystallized on addition of acetone-ether. About 78 mg. of crystals of M.P. 212–215° (dec.) are obtained. The mother liquors contain an additional 47 mg. The analytical sample is recrystallized from acetone-ether, M.P. 218–219° (dec.), $[\alpha]_D + 175°$ (c., 0.36 in chloroform, $\lambda_{max.}^{EtOH}$ 243 m$\mu$ ($\epsilon = 15,900$), $\lambda_{max.}^{Nujol}$ 3.04 $\mu$, 5.84 $\mu$, 6.10 $\mu$

*Analysis.*—Calcd. for $C_{21}H_{28}O_4BrCl$ (459.81): C, 54.85; H, 6.14; Br, 17.38. Found: C, 54.83; H, 6.02; Br, 18.34.

If Example 7 is repeated with dichlorodimethylhydantoin substituted for N-bromoacetamide, 9$\alpha$-chloro,21-bromo-$\Delta^4$-pregnene-11$\beta$,17$\alpha$-diol-3,20-dione (VII) [9$\alpha$-chloro,21-bromo-11$\beta$,17$\alpha$-dihydroxyprogesterone] is produced.

If Example 8 is repeated with dichlorodimethylhydantoin substituted for N-bromoacetamide, 9$\alpha$,21-dichloro-$\Delta^4$-pregnene-11$\beta$,17$\alpha$-diol-3,20-dione (VIII) [9$\alpha$,21-dichloro-11$\beta$,17$\alpha$-dihydroxyprogesterone] is produced.

Example 9.—9$\alpha$-bromo-$\Delta^4$-pregnene-11$\beta$,17$\alpha$-diol-3,20-dione (IX)

330 mg. of $\Delta^{4,9(11)}$-pregnadiene-17$\alpha$-ol-3,20-dione (IV) is treated with 200 mg. N-bromoacetamide, and the reaction mixture worked up as described in Example 7. The resulting crude product (about 450 mg.) is recrysalized from acetone-chloroform, and yields about 362 mg. (85%) pure 9$\alpha$-bromo-11$\beta$,17$\alpha$,dihydroxyprogresterone, having the following properties: M.P. about 189–191° (dec.); $[\alpha]_D^{23} + 128°$ (c., 0.33 in chloroform);

$\lambda_{max.}^{alc.}$ 243 m$\mu$ ($\epsilon = 16,700$); $\lambda_{max.}^{Nujol}$ 2.88 $\mu$ (OH), 5.86 $\mu$ (20-ketone), 6.04 $\mu$, 6.08 $\mu$ ($\Delta^4$-3-ketone)

analysis [calculated for $C_{21}H_{29}O_4Br$ (425.36): C, 59.29; H, 6.87; Br, 18.79; found (approximately): C, 59.59; H, 6.81; Br, 18.61].

Example 10.—9$\alpha$-chloro-$\Delta^4$-pregnene-11$\beta$,17$\alpha$-diol-3,20-dione (X) [9$\alpha$-chloro-11$\beta$,17$\alpha$-dihydroxyprogresterone]

110 mg. of $\Delta^{4,9(11)}$-pregnadiene-17$\alpha$-ol-3,20-dione (IV) is dissolved in 20 ml. of dioxane and 2 ml. of water is added. To the resulting solution is added 100 mg. of N,N-dichlorodimethylhydantoin and 1 ml. of 1 N perchloric acid and the mixture is allowed to stand at room temperature for 30 minutes. Dilute aqueous sodium sulfite solution is added to destroy residual N,N-dichlorodimethyl hydantoin and the mixture is diluted with 25 ml. of chloroform which causes separation into two layers. The chloroform-dioxane phase is separated off, washed with water, sodium bicarbonate and again with water, dried over sodium sulfate and evaporated to dryness in vacuo. The resulting residue (about 128 mg.) on recrystallization from acetone-chloroform-hexane yields pure 9α - chloro - 11β,17α-dihydroxyprogesterone, M.P. about 242–243° C. (dec.). The compound is identified by infrared spectrum and mixture melting point comparison with an authentic sample. Yield about 58 mg.

If 21-chloro-$\Delta^{4,9(11)}$-pregnadiene - 3,20 - dione is substituted for compound IV in Examples 9 and 10, 21-chloro-9α - bromo - $\Delta^4$ - pregnene - 11β - ol - 3,20-dione [21 - chloro - 9α - bromo - 11β - hydroxyprogesterone] and 9α,21 - dichloro - $\Delta^4$ - pregnene - 11β - ol-3,20-dione [9α,21 - dichloro - 11β - hydroxyprogesterone] are formed, respectively.

The following examples illustrate the preparation of 9β,11β-oxido pregnane derivatives in accordance with this invention.

*Example 11.—9β,11β - oxido - $\Delta^4$ - pregnene - 17α,21-diol-3,20-dione 21-acetate (XI)*

A solution of 180 mg. of 9α,21-dibromo-$\Delta^4$-pregnene-17α,11β-diol - 3,20 - dione (V) and 500 mg. of anhydrous potassium acetate in 25 ml. of absolute alcohol is refluxed for 2½ hrs. The ethanol is removed in vacuo and the resulting residue taken up in water and chloroform and the chloroform solution washed free of salts. After drying and evaporation of the chloroform about 155 mg. of crystalline material are obtained. Recrystallization from acetone-ether affords about 50 mg. of pure material M.P. 207–209° and about 17 mg. of M.P. 195–196° (47%), $[\alpha]_D +30°$ (c., 0.41 in chloroform). Infrared comparison showed identity with authentic 9β,11β-oxido-$\Delta^4$-pregnene - 17α,21 - diol - 3,20 - dione 21-acetate (cf. the aforementioned application Serial No. 417,409).

*Example 12.—21 - chloro - 9β,11β - oxido-$\Delta^4$-pregnene-17α - ol - 3,20 - dione (XII)*

The process of Example 11 is repeated with 9α-bromo-21-chloro-$\Delta^4$-pregnene - 11β,17α - diol - 3,20 - dione (VI) substituted for 9α,21 - dibromo - $\Delta^4$-pregnene - 17α,11β-diol - 3,20 - dione (V). The solution of VI and potassium acetate in absolute alcohol is refluxed for 20 minutes rather than 2½ hours. Isolation and purification in accordance with the method of Example 11 yields 21-chloro-9β,11β-oxido-$\Delta^4$-pregnene-17α-ol-3,20-dione.

*Example 13.—21 - chloro - 9β,11β - oxido-$\Delta^4$-pregnene-3,20-dione*

The process of Example 11 is repeated with 21-chloro 9α - bromo - $\Delta^4$-pregnene - 11β-ol-3,20-dione substituted for 9α,21 - dibromo - $\Delta^4$-pregnene-17α,11β-diol-3,20-dione (V). After isolating and purifying in accordance with the method of Example 11, 21-chloro-9β,11β-oxido-$\Delta^4$-pregnene-3,20-dione is obtained.

9β,11β - oxido-$\Delta^4$-pregnene-17α,21 - diol - 3,20-dione 21-acetate (XI) may be converted to 9α-halo-$\Delta^4$-pregnene-11β,17α,21 - triol - 3,20 - dione (9α-halohydrocortisone) and its 21-acyl derivatives (e.g., 9α - halohydrocortisone acetate) as well as the corresponding 9α - halo - $\Delta^4$-pregnene - 17α,21 - diol - 3,11,20 - trione (9α - halocortisone) and its 21 - acyl derivatives (e.g., 9α-halocortisone 21-acetate) by the method disclosed in the aforementioned application Serial Number 417,489.

21-chloro-9β,11β - oxido-$\Delta^4$-pregnene - 17α - ol - 3,20-dione (XII) similarly may be converted to the corresponding 21-chloro-9α - halo-$\Delta^4$ - pregnene - 11β,17α-diol-3,20 - dione as well as 21-chloro-9α-halo-$\Delta^4$-pregnene-17α-ol-3,11,20-trione, which are new steroids having mineralo- and glucocorticoid activity; and 21-chloro-9β,11β-oxido-$\Delta^4$-pregnene - 3,20 - dione may also be converted to the corresponding 21-chloro-9α - halo-$\Delta^4$-pregnene - 11β-ol-3,20-dione as well as 21-chloro-9α-halo-$\Delta^4$-pregnene-3,11,20-trione, which are new steroids having mineralocorticoid activity.

A second process related to the process of this invention is shown in the following schematic analysis:

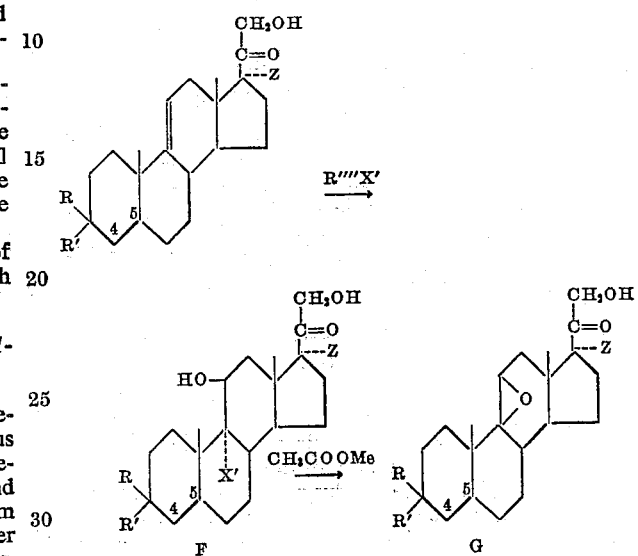

wherein the 4,5 position is double-bonded or saturated (the 4,5-double-bonded steroids being preferred), and wherein R is hydrogen, R' is hydroxy, or together R and R' is oxo (keto) or a group convertible thereto by hydrolysis (e.g. ketal) (R and R' as oxo being preferred); Z is hydrogen or α-hydroxy; R''''X' is N-bromoamide (including imide) of a carboxylic acid (including derivatives), dibromodimethylhydantoin, or dichlorodimethylhydantoin; X', therefore, being bromo or chloro; Me is a metal and preferably an alkali metal such as sodium or potassium.

Compounds suitable as initial reactants in the foregoing process of the invention include: $\Delta^{4,9(11)}$- pregnadiene-17α,21-diol-3,20-dione; $\Delta^{4,9(11)}$-pregnadiene-21-ol-3,20-dione; $\Delta^{9(11)}$-pregnene-17α,21-diol-3,20-dione; $\Delta^{9(11)}$-pregnene-21-ol-3,20-dione, etc. These comounds are reacted with a hydroxychlorinating or hydroxy-brominating agent (R''''X', wherein R''''X' is as above-defined), and preferably N-bromoacetamide (or other N-bromo-lower alkanoic acid amide), N-bromosuccinimide, N-chloroacetamide (or other N-chloro-lower alkanoic acid amide), N-chlorosuccinimide, dibromodimethylhydantoin, or dichlorodimethylhydantoin, in accordance with the method disclosed in the copending applications of Fried, Serial No. 417,489, filed March 10, 1954; and Fried et al., Serial No. 429,108, filed May 11, 1954. As disclosed in those applications, the conversion is preferably effected in the presence of perchloric acid or other relatively strong acid. This reaction produces compounds F having a 9α-chloro or bromo substituent and an 1β-hydroxy radical.

Compounds F are then reacted with metal acetates, preferably alkali metal acetates such as potassium acetate, in a suitable solvent such as alcohol, a lower alkanoic acid, or a ketone (preferably in an alkanol such as ethanol) as described in the aforementioned application Serial No. 417,489. By this reaction, compounds G, having a 9β,11β-oxido radical, are formed. Compounds G may then be reacted as disclosed in Serial No. 417,489 to produce 9α-halo, 11β-hydroxy derivatives.

This process is described in detail in the following schematic analysis and examples in connection with the use of Δ⁴,⁹⁽¹¹⁾-pregnadiene-17α,21-diol-3,20-dione as a starting material, but is of course not limited thereto:

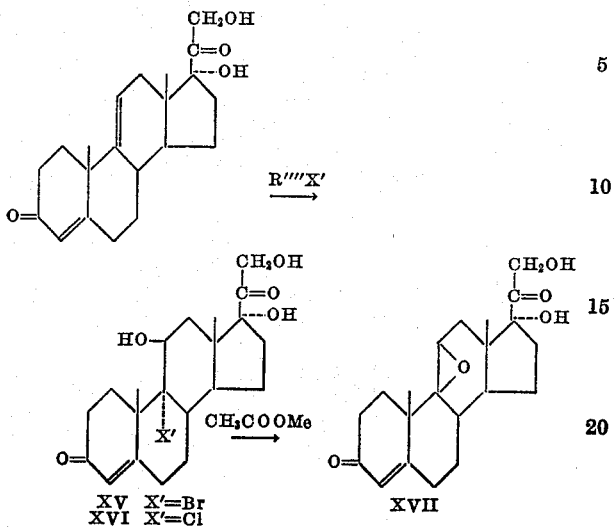

XV X'=Br
XVI X'=Cl

*Example 14.—9α-bromo-Δ⁴-pregnene-11β,17α,21-triol-3, 20-dione (XV)*

To a solution of Δ⁴,⁹⁽¹¹⁾-pregnadiene-17α,21-diol-3,20-dione, M.P. 237-240°, in 30 ml. of dioxane is added 5 ml. of ⅓ N perchloric acid and 160 mg. of N-bromoacetamide. The solution is stirred for 1¼ hours, then 8 ml. of 10% Na₂SO₃ solution is added. The solution is diluted with 30 ml. of water and extracted with four portions each of 30 ml. of chloroform. The combined chloroform extracts are washed with water, sodium bicarbonate and again with water, dried over Na₂SO₄ and concentrated to dryness in vacuo. The semisolid residue is suspended in 5 ml. of hot ethyl acetate and filtered. The resulting crystals (about 175 mg., carbonization at 140-150°) on repeated crystallization from ethyl acetate furnish about 30.2 mg. of material, carbonization at 128-135°, [α]_D²⁴+166.7° (in 95% ethanol)

λ_max^ethanol 242 mμ (ε=16,800)

*Analysis.*—Calcd. C₂₁H₂₉O₅Br (441.26): C, 57.14; H, 6.62; Br, 18.11. Found: C, 57.67; H, 6.89; Br. 18.27.

By substituting dichlorodimethylhydantoin for the N-bromoacetamide of the above example, 9α-chloro-Δ⁴-pregnene-11β,17α,21-triol-3,20-dione (XVI) is formed in the same manner.

*Example 15.—Δ⁴ - pregnene - 9β,11β - oxido - 17α,21-diol-3,20-dione (XVII)*

To a solution of 25 mg. of potassium acetate and 0.02 ml. of pyridine in 7 ml. of absolute ethanol is added 31 mg. of 9α-bromo-Δ⁴-pregnene-11β,17α-21-triol-3,20-dione (XV). The resulting solution is refluxed for 40 minutes, cooled down to 7°, 25 ml. of water are added and the cold opalescent solution extracted with 3 portions of 20 ml. of ethyl acetate. The ethyl acetate extract is washed with water, dried over Na₂SO₄ and concentrated to dryness in vacuo. Repeated recrystallizations give about 6 mg. of Δ⁴-pregnene-9β,11β-oxido-17α,21-diol-3,20-dione, M.P. 211-213°. The identity of this compound was established by infrared comparison with an authentic sample.

Compound XVII may also be formed from the 9α-chloro analog (Compound XVI) by substituting the 9α-chloro-compound for the 9α-bromo derivative.

The invention may be otherwise embodied within the scope of the appended claims.

We claim:
1. A compound selected from the group consisting of:

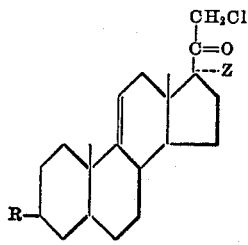

and

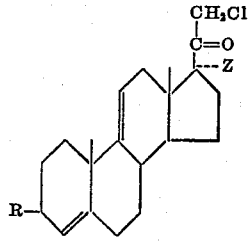

wherein R is selected from the group consisting of keto and ketal; and Z is selected from the group consisting of hydrogen and hydroxy.

2. 21-chloro-Δ⁴,⁹⁽¹¹⁾-pregnadiene-17α-ol-3,20-dione.
3. 21-chloro-Δ⁴,⁹⁽¹¹⁾-pregnadiene-3,20-dione.

References Cited in the file of this patent

UNITED STATES PATENTS

| | | |
|---|---|---|
| 2,409,798 | Reichstein | Oct. 22, 1946 |
| 2,666,070 | Murray et al. | Jan. 12, 1954 |
| 2,681,919 | Levin et al. | June 22, 1954 |
| 2,684,968 | Bergstrom | July 27, 1954 |
| 2,703,799 | Bergstrom | Mar. 8, 1955 |
| 2,707,190 | Farrar | Apr. 26, 1955 |
| 2,712,028 | Rosenkranz | June 28, 1955 |
| 2,730,525 | Hogg et al. | Jan. 10, 1956 |
| 2,734,897 | Chemrda | Feb. 14, 1956 |
| 2,736,734 | Sarett | Feb. 28, 1956 |
| 2,773,080 | Bernstein | Dec. 4, 1956 |

UNITED STATES PATENT OFFICE
Certificate of Correction

Patent No. 2,892,850                                June 30, 1959

Josef Fried et al.

It is hereby certified that error appears in the printed specification of the above numbered patent requiring correction and that the said Letters Patent should read as corrected below.

Column 3, lines 52 to 62 inclusive, right-hand portion of the formula should appear as shown below instead of as in the patent:

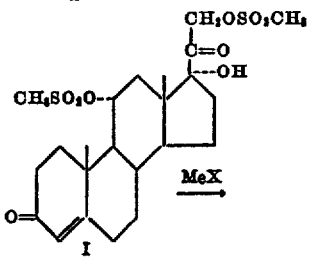

column 8, line 63, for "1β-hydroxy" read —11β-hydroxy—.

Signed and sealed this 10th day of November 1959.

[SEAL]

Attest:
KARL H. AXLINE,
*Attesting Officer.*

ROBERT C. WATSON,
*Commissioner of Patents.*